July 4, 1944.  E. B. ANDERSON  2,352,753
METHOD OF AND APPARATUS FOR GENERATING ARCUATE RACEWAYS
Filed Sept. 21, 1940  2 Sheets-Sheet 2
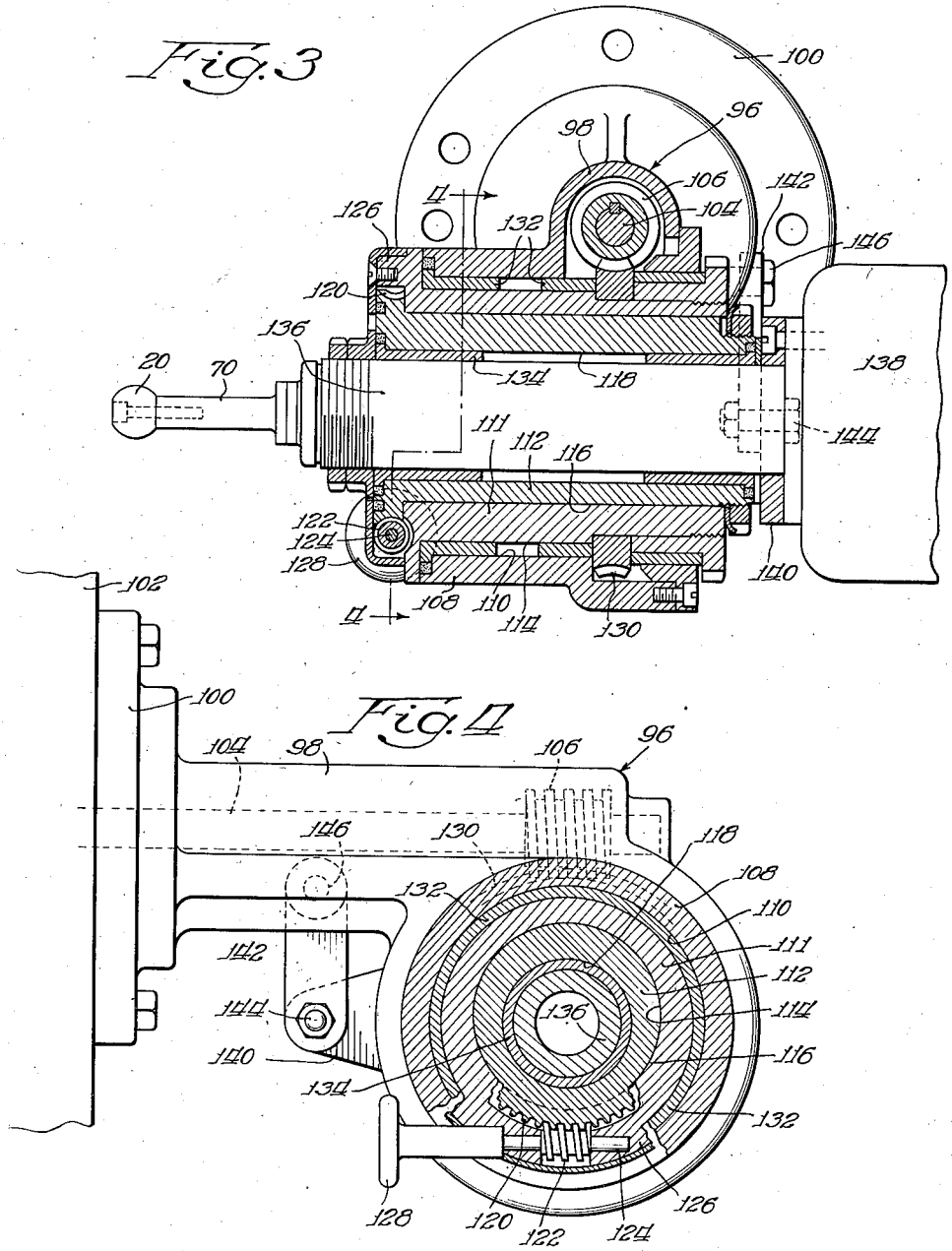
Inventor:
Edmund B. Anderson
By: Edward C. Fitzhugh
Atty.

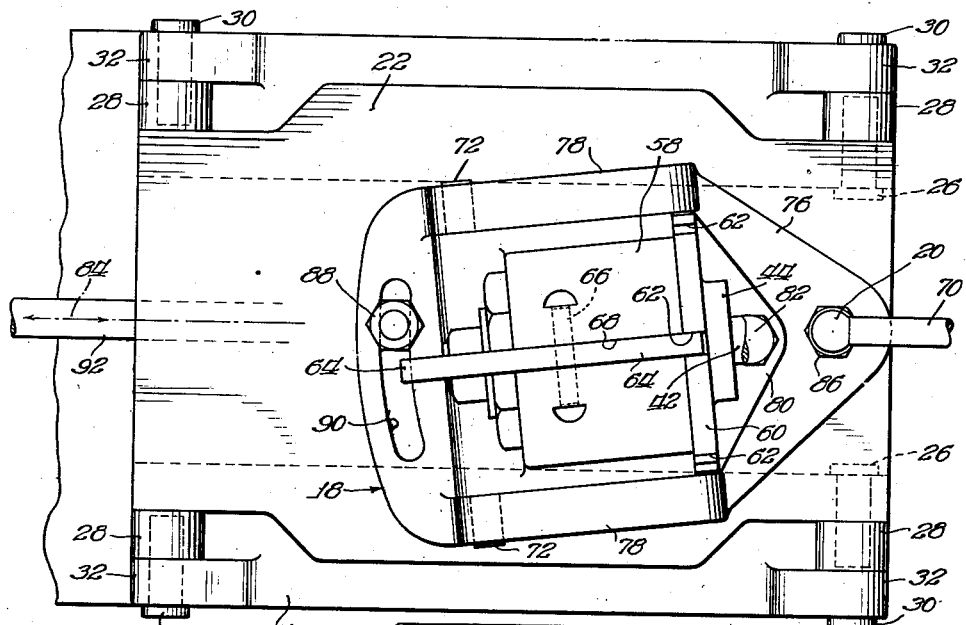

Patented July 4, 1944

2,352,753

UNITED STATES PATENT OFFICE 2,352,753

METHOD OF AND APPARATUS FOR GENERATING ARCUATE RACEWAYS

Edmund B. Anderson, Rockford, Ill., assignor to Borg-Warner Corporation, Chicago, Ill., a corporation of Illinois Application September 21, 1940, Serial No. 357,749

4 Claims. (Cl. 51—90)

This invention relates to the processing of torque transmitting elements of universal joints, particularly of the constant velocity type, and has as its general object to provide an improved and simplified method of and apparatus for generating in such a torque transmitting element, a torque transmitting ball raceway that is curved longitudinally on an arc defining a great circle of the center of the element.

The invention further contemplates the provision of a method and apparatus for generating an arcuate raceway the arc of curvature of which may be disposed with reference to the axis of rotation of the element, either as a meridian or at an angle of inclination with reference to a meridian. The invention aims particularly to provide a method and apparatus by which a raceway, disposed at an angle to a meridian may be generated as readily as a raceway disposed meridionally. In addition, the invention aims to provide for changing the angle of inclination of the raceway with reference to a meridian, so as to make it possible to develop a series of raceways in a spherical universal joint element, wherein the raceways are alternately inclined in opposite directions in successively converging and diverging relationship. An improved constant velocity joint embodying this relationship and having certain improved characteristics as a result thereof, is covered in my co-pending application Serial No. 357,739, filed September 21, 1940.

A further object of the invention is to provide an improved method and apparatus whereby a raceway of high accuracy may be generated by moving the work against a revolving tool, and wherein the accuracy of contour of the raceway may be readily maintained by intermittently performing a simple adjustment to compensate for tool wear.

Other objects, the advantages and uses of the invention will become more apparent after reading the following specification and claims, and after consideration of the drawings forming a part of the specification, wherein:

Fig. 1 is a plan view of the work moving mechanism of my improved apparatus;

Fig. 2 is a longitudinal sectional view thereof, showing one of the torque transmitting elements.

Fig. 3 is a longitudinal sectional view of the grinding mechanism; and

Fig. 4 is a transverse sectional view thereof taken as indicated by the line 4—4 of Fig. 3.

The particular type of universal joint element adapted to be developed by the present invention may be either a female element 10, shown in section in Fig. 2, provided with a bore 14 by means of which it may be mounted on a shaft, and having interior arcuate raceways 16 formed along great circles of the element, i. e., concentric with the center C thereof, or may comprise a male element adapted to be received in the shell 10 and having arcuate raceways corresponding to the raceways 16 and adapted to be drivingly connected thereto by hardened torque transmitting balls each received in a pair of respective raceways.

The torque transmitting element is adapted to be mounted on a swinging carriage 18 and to be moved thereby in an arcuate path against a tool 20 rotating in a substantially fixed position as will hereinafter be more fully explained.

The carriage 18 includes a bed 22 having at its four corners legs 24 which are pivoted at 26 to the lower ends of links 28, the upper ends of which are pivoted at 30 to uprights 32 carried by a base 34. Thus, the bed 22 is suspended for swinging movement in a path inversely corresponding to the arcuate longitudinal curvature of the raceway 16 being operated upon by the tool 20, as indicated by the broken line 36 designating the path of swinging movement of one of the pivots 26.

The element 10 is mounted on the carriage 18 by means of a fixture 38 including an arbor 40 having a reduced end 42 adapted to be snugly received in the bore 14 of the element 10. The arbor 40 is mounted in a sleeve 44 and secured therein by a nut 46 threaded on its threaded end 48 opposite the reduced end 42, and a washer 50 interposed between the nut 46 and the end of the sleeve 44. The element 10 is secured by a screw 52 threaded into the reduced end 42 of the arbor and a washer 54 interposed between the screw 52 and the hub 12 of the element, which is thereby pressed against the end of the sleeve 44.

In order to provide for the machining of a plurality of circumferentially spaced raceways 16, the element 10 is adapted to be rotatably adjusted to a plurality of angularly separated positions. To this end, the sleeve 44 is rotatably mounted in a bore 56 formed in a bracket 58, and is provided with a flange 60 having notches 62 each defining one position of adjustment. A latch 64 pivoted at 66 in a slot 68 in the bracket 58 is adapted to engage in any one of the notches 62 for holding the sleeve in any position to which it has been adjusted.

The tool 20 is mounted on the end of a stem 70 by means of which the tool may be projected into the element 10 to the full depth required for forming the raceways 16. The axis of the stem 70 may be disposed at any angle of inclination with reference to the axis of the arbor 40 which permits the tool to operate throughout the length of the raceways 16 without interference between the stem and the wall of the element 10. The angle of inclination of the arbor 40 with reference to the horizontal may be adjusted by tilting the fixture 38 around a horizontal axis. For this purpose, the carriage 18 includes a member 76 having a pair of ears 78 between which the lower region of the bracket 58 is received and hinged at 72. Opposite the hinge 72, the bracket 58 is provided with a horizontal ear 80 through which a screw 82 is extended and threaded into the carriage member 76. By interposing washers between the ear 80 and the member 76, the bracket 58 may be tilted with reference to the member 76.

In a preferred form of constant velocity joint of the type under consideration, the raceways 16 are inclined with reference to meridians of the elements 10. The invention provides for this inclination by arranging the axis of the arbor 40 at an angle to a vertical plane of the center of the tool 20 such as the plane indicated by the broken line 84, and swinging the carriage 18 in a path which is parallel to that plane. This is accomplished by mounting the member 76 on the bed 22 for horizontal swinging movement around the vertical axis of a screw 86 extended through one end of the member 76 and threaded into the bed 22. The member 76 is adapted to be secured in any desired adjusted position by tightening a screw 88 which extends through an arcuate slot 90 in the other end of the member 76. The slot 90 is of sufficient extent to permit adjustment of the axis of the arbor 40 to either side of the plane 84 to the extent required for forming the raceways 16 in diverging and converging relationship as shown in Fig. 2.

The axis of the pivot 86 intersects the axis of the arbor 40 at the center C of the element 10 and lies in the plane 84, so that in any position of horizontal adjustment of the fixture 38 around the pivot 86, the raceway generated by the movement of the work against the tool will define a great circle of the element. With the fixture centered in the plane 84, such great circle will be a meridian. Thus, the invention is adapted to produce meridional raceways if it is desired to do so. With the fixture 38 adjusted to an angle of inclination with reference to the plane 84, the resulting raceways will be disposed at an angle to a meridian.

Rocking movement of the carriage 18 is induced by reciprocating the bed 22 by any suitable reciprocating mechanism. A portion of such mechanism is indicated in Fig. 2 in the form of a pitman 92 pivoted at 94 to the bed 22.

Swinging movement of the carriage 18 in a path corresponding to the broken line 36, with the element 10 in engagement with the rotating tool 20 will result in the generation of the raceway 16 the arc of curvature of which is inversely related to the path of movement of the element 10 at the point of contact with the tool.

The cross-sectional shape of the raceway 16 may coincide exactly with the cross-sectional shape of the tool 20. In this case, the tool 20 will be rotated upon a fixed axis. However, as the tool 20 wears down to a smaller diameter, the cross-sectional area of the raceway would tend to correspondingly decrease. The invention provides for maintaining the cross-sectional area of the raceway uniform by planetating the tool 20 about an orbit the periphery of which corresponds to the desired cross-sectional shape of the raceway 16. The orbit of the tool is preferably circular so that a circular cross-sectional shape will be produced. However, the orbit may be eliptical so as to produce an eliptical cross-sectional shape in the raceway in the event it is desired to employ such shape.

The mechanism for driving the tool and for planetating the same is shown in Figs. 3 and 4. It comprises a bracket 96 including a shaft housing portion 98 terminating in a flange 100 adapted to be attached to a suitable source of power as for example a milling machine 102, with the tool shaft 104 of the milling machine extending through the tubular arm 98 and provided with a worm 106 for producing the planetating motion. Formed on the end of the arm 98 is a cylindrical sleeve 108 having a bore 110 in which is journalled the outer of a pair of planetating sleeves 111 and 112, respectively. The sleeve 111 has a bore 114 which is eccentric with reference to the exterior surface of the sleeve, and the inner sleeve 112 has an exterior surface 116 which is eccentric to the bore 118 thereof.

The inner sleeve 112 is formed at one end with a worm wheel 120 which coacts with a worm 122 mounted on a shaft 124 journalled in a rim 126 at one end of the outer sleeve 111, and adapted to be rotated by a knob 128 on one end of the shaft. Rotation of the knob 128 will produce relative rotation between the sleeves 110 and 112 resulting in displacement of the axis of the bore 118 radially with reference to the axis of the bore 110 in which the sleeves 111 and 112 rotate as a unit. The latter rotation is produced by worm 106 meshing with a worm wheel 130 mounted on the outer sleeve 111. As a result of such rotation of the sleeves 111, 112, the axis of the bore 118 will planetate in an orbit the radius of which is determined by the adjustment between the sleeves 111 and 112. This radius may vary from zero, with the axes of the bores 118 and 110 coinciding, to any desired maximum determined by the eccentricity of the sleeves 111, 112.

Antifriction bearings 132 are preferably interposed between the bore 110 and the outer sleeve 111.

Mounted in bearings 134 in the bore 118 of the inner sleeve 112, is the tool spindle 136 in one end of which the stem 70 is removably mounted. On the other end of the spindle 136 is carried a motor 138 by means of which the spindle is rotated. The motor 138 is anchored against rotation under the reaction from driving the spindle, by an arm 140 secured to one end to the motor, and a link 142 pivoted at 144 to the other end of the arm 140 and pivoted at 146 to the bracket 96.

I claim:

1. Apparatus for generating, in a rotatable body having a center disposed on its axis of rotation, longitudinally arcuate grooves lying in planes intersecting said axis at an acute angle thereto at said center, comprising a tool, a carriage, a fixture supported on said carriage, and adapted to support said body for movement against said tool, said carriage including a member that is supported for swinging movement such as to cause the body to describe a path of movement against the tool by which the desired longitudinal contour of the groove will be developed, said carriage including a second member mounted upon said swingingly mounted member for adjustment around an axis intersecting the center of the element and lying in the plane of the path of swinging movement of the body in the region of contact by the tool, whereby the axis of the body may be adjusted to an angle with reference to the plane of said path of swinging movement, said fixture being mounted upon said second member and including a rotatably adjustable part on which the body is mounted for adjustment around the axis of said body so as to present circumferentially spaced portions of said body to said tool.

2. An apparatus as defined in claim 1 including a base provided with a plurality of uprights, and a plurality of links the upper ends of which are pivoted to said uprights and the lower ends of which are pivoted to said first carriage member, the distance between the pivots of a given link corresponding to the radius of longitudinal curvature of the raceways.

3. Apparatus for generating in a rotatable body having a center disposed on its axis of rotation, a plurality of circumferentially separated longitudinally arcuate grooves lying in planes intersecting said axis at an acute angle thereto at the center, comprising a tool, a workholder on which the body may be indexed to present circumferentially spaced portions thereof to the tool, means on which said workholder is mounted for swinging movement such as to cause the body to describe a path of movement against the tool by which the desired longitudinal contour of the groove will be developed, said workholder being disposed with reference to said mounting means with the axis of indexing movement at an acute angle to a plane of swinging movement of any point in said axis.

4. Apparatus as defined in claim 3, including means for planetating the tool to develop an accurate semicircular cross sectional contour in the grooves.

EDMUND B. ANDERSON.